(12) United States Patent
Hoshikawa et al.

(10) Patent No.: US 7,428,329 B2
(45) Date of Patent: Sep. 23, 2008

(54) PICKUP IMAGE PROCESSING DEVICE OF ELECTRONIC PART MOUNTING DEVICE AND PICKUP IMAGE PROCESSING METHOD

(75) Inventors: Kazumi Hoshikawa, Toyohashi (JP); Mikio Nakajima, Toyokawa (JP)

(73) Assignees: Fuji Machine Mfg. Co., Ltd., Aichi (JP); Edeclinseysystem Co., Ltd., Aichi (JP)

( * ) Notice: Subject to any disclaimer, the term of this patent is extended or adjusted under 35 U.S.C. 154(b) by 290 days.

(21) Appl. No.: 10/558,283

(22) PCT Filed: May 25, 2004

(86) PCT No.: PCT/JP2004/007093

§ 371 (c)(1),
(2), (4) Date: Nov. 28, 2005

(87) PCT Pub. No.: WO2004/106851

PCT Pub. Date: Dec. 9, 2004

(65) Prior Publication Data

US 2007/0013803 A1 Jan. 18, 2007

(30) Foreign Application Priority Data

May 28, 2003 (JP) .............................. 2003-150939

(51) Int. Cl.
*G02B 13/16* (2006.01)

(52) U.S. Cl. ........................ 382/151; 382/154; 348/335

(58) Field of Classification Search ................. 382/151, 382/154

See application file for complete search history.

(56) References Cited

U.S. PATENT DOCUMENTS 6,246,789 B1 * 6/2001 Hosotani et al. ............ 382/151

(Continued)

FOREIGN PATENT DOCUMENTS

JP 8-201021 A 8/1996

(Continued)

*Primary Examiner*—Samir A Ahmed
*Assistant Examiner*—Michael Vanchy, Jr.
(74) *Attorney, Agent, or Firm*—Foley & Lardner LLP (57) ABSTRACT

An existing electronic part mounting device can have the function of correcting the parallax of a camera pickup image only by addition or modification of software without using a telecentric lens. For this, storage means stores in advance parallax data representing the relationship between the height of an electronic part to be picked up by a camera and a part size per pixel for each pixel of the pickup image or image magnification. When picking up the electronic part adsorbed by an adsorption nozzle (11) by the camera, the part height data on the height of the electronic part is acquired, so that according to the part height data and the aforementioned parallax data, a part size per pixel or image magnification is corrected for each pixel of the pickup image of the electronic part, thereby correcting the parallax of the pickup image of the electronic part.

4 Claims, 5 Drawing Sheets

U.S. PATENT DOCUMENTS

| | | | |
|---|---|---|---|
| 6,307,526 B1 * | 10/2001 | Mann | 345/8 |
| 6,445,833 B1 * | 9/2002 | Murata et al. | 382/285 |
| 6,584,219 B1 * | 6/2003 | Yamashita et al. | 382/154 |
| 6,629,553 B2 * | 10/2003 | Odashima et al. | 156/584 |
| 6,678,944 B1 | 1/2004 | Kawada | |
| 6,681,468 B1 * | 1/2004 | Uchiyama et al. | 29/407.01 |
| 6,683,699 B1 * | 1/2004 | Ashizaki et al. | 358/1.18 |
| 6,876,761 B1 * | 4/2005 | Okuda et al. | 382/151 |
| 6,904,672 B2 * | 6/2005 | Nagafuku et al. | 29/840 |
| 2003/0026474 A1 * | 2/2003 | Yano | 382/154 |
| 2005/0129281 A1 * | 6/2005 | Ashizaki et al. | 382/112 |

FOREIGN PATENT DOCUMENTS

| | | |
|---|---|---|
| JP | 2000-294990 A | 10/2000 |
| JP | 2001-217599 A | 8/2001 |
| JP | 2002-084456 A | 3/2002 |
| JP | 3361682 B2 | 10/2002 |

\* cited by examiner

PICKUP IMAGE PROCESSING DEVICE OF ELECTRONIC PART MOUNTING DEVICE AND PICKUP IMAGE PROCESSING METHOD

TECHNICAL FIELD

The present invention relates to a pickup image processing device for an electronic component mounting apparatus provided with a camera for imaging an electronic component adsorbed by an adsorption nozzle and a method of pickup image processing.

BACKGROUND ART

Figure 1A:
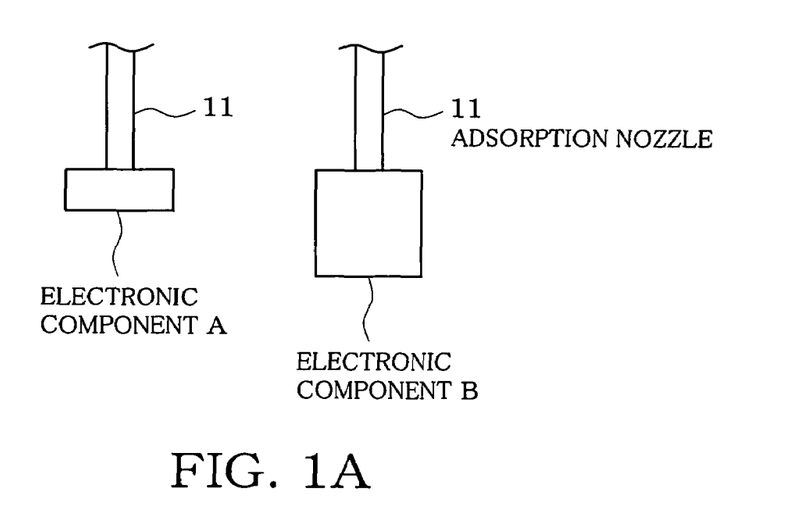
[FIG. 1A] A front view of an adsorption nozzle adsorbing an electronic component.
Figure 1B:
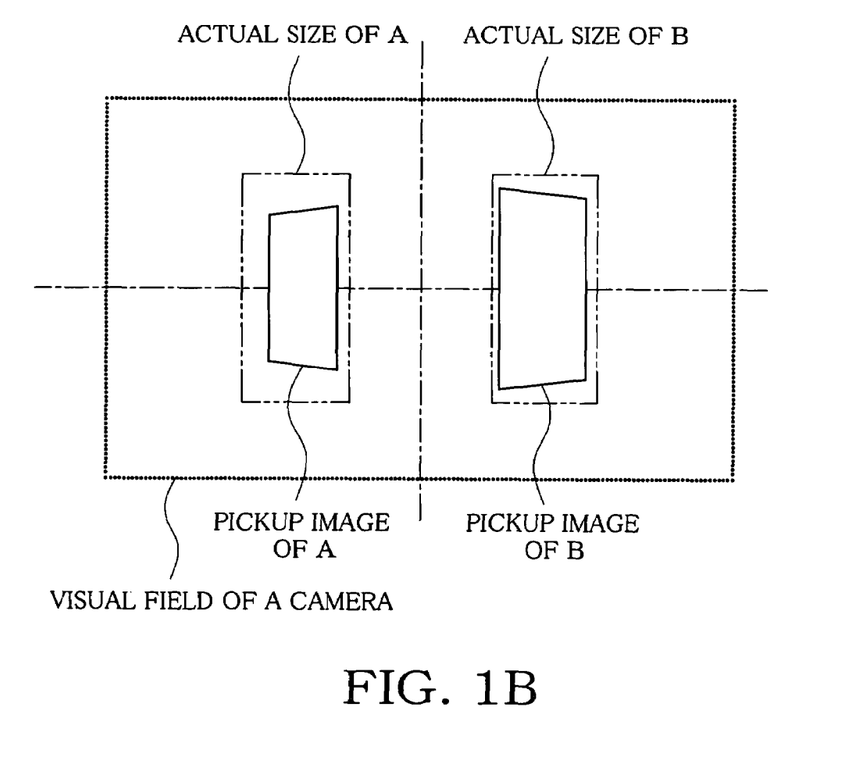
[FIG. 1B] A view explaining a pickup screen.

In recent electronic component mounting apparatus, an electronic component adsorbed by an adsorption nozzle is imaged by a camera during a period between adsorption of the electronic component by the adsorption nozzle and mounting of the electronic component on a circuit board. Based on a pickup image, appearance information (size or the like, for example) and adsorbed location information (a central position and inclination θ of the component and the like, for example) are detected so that an accuracy in a mounted position of the electronic component is ensured or so that mounting of defective components can be prevented. In this case, in order that a mounting efficiency may be improved, a plurality of electronic components adsorbed by a plurality of adsorption nozzles respectively are caused to come within a visual field of a camera at the same time and imaged so that appearance information and adsorbed location information are detected at a single time of imaging, as shown in FIGS. 1A and 1B.

Since cameras generally have parallax, the cameras have characteristics that an image of an electronic component becomes smaller (magnification of image is reduced) as the electronic component to be imaged is spaced farther away from the camera and as the image is shifted away from the center of the visual field of the camera. Accordingly, as shown in FIG. 1B, even when an electronic component to be imaged is actually rectangular in shape, the parallax of the camera deforms an image of the electronic component into a trapezoidal shape, or a height (thickness) of the electronic component changes a distance between the camera and the electronic component such that the size of an obtained image of the electronic component is changed. In particular, when a plurality of electronic components are imaged by a camera at the same time, a plurality of electronic components to be imaged have different heights or horizontal distances between the center of the visual field of the camera and the electronic components differ from each other. Accordingly, a degree of deformation in pickup image and a degree of scale-down in an image size differ in every electronic component, whereupon appearance information and adsorbed position information of each electronic component cannot accurately be detected.

In order to overcome the above-described problems due to the camera parallax, the following patent document 1 proposes an arrangement in which a telecentric lens for parallax correction is disposed in front of the camera and an electronic component is imaged so that a pickup image of the electronic component basically remains unchanged even when the position of the electronic component changes.

Patent document 1: JP-A-2001-217599

DISCLOSURE OF THE INVENTION

Problem to be Overcome by the Invention

However, when a telecentric lens is used, the telecentric lens needs to have a diameter approximately as large as the visual field of the camera. In particular, when a plurality of electronic components are imaged by a camera at the same time, the visual field of the camera is increased and a large telecentric lens accordingly needs to be used. The camera has no sufficient space in front thereof for disposing the telecentric lens depending upon a type of the electronic component mounting apparatus. As a result, there is a case where the telecentric lens cannot be disposed. Furthermore, when the telecentric lens is mounted on a mounting head of the electronic component mounting apparatus, an increase in the weight of the mounting head results in a problem and there occurs a problem that it is difficult to increase a moving speed of the mounting head. Moreover, since a telecentric lens has no diaphragm, there is a problem that adjustment of brightness is difficult. Furthermore, since the telecentric lens is expensive, there is a problem that a production cost of the electronic component mounting apparatus is increased.

The present invention was made to over come these problems and accordingly, an object of the present invention is to provide a pickup image processing device for an electronic component mounting apparatus which can provide a function of correcting parallax of pickup image of a camera only by addition to or change in software (program) with respect to an existing electronic component mounting apparatus without use of a telecentric lens and a method of pickup image processing.

Means for Overcoming the Problem

To achieve the object, in the present invention, storage means previously stores parallax data indicative of a relationship between a height of the electronic component and component size or image magnification per pixel for every pixel of the pickup image, and the component height data with respect to the height (thickness) of the electronic component is taken in when the electronic component is imaged by the camera, so that parallax of the pickup image of the electronic component is corrected by correcting the component size or image magnification per pixel for every pixel of the pickup image based on the component height data and the parallax data. Consequently, an existing electronic component mounting apparatus can be provided with a function of correcting parallax of the camera only by addition to or change in software (program) without use of a telecentric lens. Thus, the problems due to parallax correction by use of a telecentric lens can be overcome once for all.

In this case, in producing parallax data, an interval between maximum and minimum values of the height of the electronic component may be divided into sub-divisions so that parallax data is produced by measuring or computing the component size or image magnification per pixel for every pixel of the pickup image with respect to the heights of the electronic components and stored in storage means. When electronic components are imaged by a camera, parallax data indicative of the height nearest to the data of the actual component height may be selected for parallax correction. However, since an image imaged by a single camera contains a large number of pixels, parallax data becomes enormous when produced with respect to heights of a large number of components. As a result, storage means with a large storage capacity is necessitated to store the enormous parallax data.

In order to avoid this, storage means may store parallax data obtained by measuring or computing the component size or image magnification per pixel for every pixel of the pickup image with respect to two larger and smaller heights of the electronic component (maximum and minimum values, for example). The parallax data may be interpolated for every pixel of the pickup image of the electronic component based on the component height data, whereby the parallax of the pickup image of the electronic component is corrected. Consequently, parallaxes can be corrected with respect to the heights of all the electronic components using the parallax data produced with respect to two, larger and smaller heights of the electronic component, whereupon the parallax data can be avoided from being rendered enormous.

The present invention can be applied to the case where a single electronic component is imaged by a single camera but may be applied to the case where a plurality of electronic components adsorbed by a plurality of adsorption nozzles respectively are caused to come within a visual field of a camera simultaneously and imaged by the camera. In this case, pickup images of a plurality of electronic components are determined in the visual field of the camera and parallaxes of pickup images of the electronic components are individually corrected using corresponding component height data and parallax data for every electronic component. Consequently, when a plurality of electronic components are caused to come within a visual field of the camera thereby to be imaged, parallaxes of pickup images of the electronic components can individually be corrected even when a plurality of electronic components have different heights or a horizontal distance from the visual field center of the camera to each electronic component differs from one to another.

Furthermore, a calibration jig made of a light-transmissible material into a plate shape may be used when the parallax data is produced, and the calibration jig may have one side on which calibration marks are formed at predetermined pitches into a matrix. The calibration mark side of the calibration jig may be adsorbed by the adsorption nozzle and imaged by the camera so that a position of each calibration mark is recognized, thereby computing a component size or image magnification per pixel for every pixel of the pickup image with respect to a minimum height of the electronic component. A computed value may be stored as parallax data at the minimum height of the electronic component in the storage means. The other side of the calibration jig opposed to the calibration marks may be adsorbed by the adsorption nozzle and imaged by the camera so that a position of each calibration mark is recognized, thereby computing a component size or image magnification per pixel for every pixel of the pickup image with respect to the same height of the electronic component as a height of the calibration jig, and the computed value may be stored in the storage means as parallax data with respect to the same height of the electronic component as a height of the calibration jig. Consequently, parallax data can readily be produced with respect to two larger and smaller heights of the electronic component using the calibration jig.

BEST MODE FOR CARRYING OUT THE INVENTION

One embodiment of the present invention will be described with reference to the drawings. The present invention can be applied to all types of electronic component mounting apparatus on condition that the electronic component mounting apparatus are provided with respective cameras for imaging an electronic component adsorbed by an adsorption nozzle, irrespective of a system configuration. Accordingly, the description of mechanical construction of the electronic component mounting apparatus will be eliminated. JP-A-2000-294990 discloses an example of electronic component mounting apparatus with respective cameras.

A computer controlling the electronic component mounting apparatus images electronic components A and B adsorbed by respective adsorption nozzles 11 by a camera and captures pickup image during a time period from adsorption of the electronic components A and B by the adsorption nozzles 11 to the mounting of the components on a circuit board, as shown in FIG. 1A. In this case, for improvement in the mounting efficiency, a plurality of electronic components A and B adsorbed by a plurality of adsorption nozzles 11 are caused to come within the same visual field of the camera and are imaged by the camera.

Since cameras generally have parallax, the cameras have characteristics that an image of the electronic components A and B becomes smaller (magnification of image is reduced) as the electronic components A and B to be imaged are spaced farther away from the camera and as the image is shifted away from the center of the visual field of the camera. Accordingly, as shown in FIG. 1B, even when each of the electronic components A and B to be imaged is actually rectangular in shape, the parallax of the camera deforms an image of each of the electronic components A and B into a trapezoidal shape, or a height (thickness) of each of the electronic components A and B changes a distance between the camera and each of the electronic components A and B such that the size of an obtained image of each of the electronic components A and B is changed. In particular, when a plurality of electronic components A and B are imaged by a camera at the same time, a plurality of electronic components A and B to be imaged have different heights or horizontal distances between the center of the visual field of the camera and the respective electronic components A and B differ from each other. Accordingly, a degree of deformation in pickup image and a degree of scale-down in an image size differ in every electronic component, whereupon appearance information (size and the like, for example) and adsorbed location information (central position of the component, inclination θ and the like, for example) of each electronic component cannot accurately be detected.

When a large telecentric lens for parallax correction is used to overcome this problem, requirements for low cost, space saving, high head speed and the like cannot be met as described above.

In the embodiment, then, an existing electronic component mounting apparatus is provided with a function of correcting parallax of pickup image of the camera only by addition of or change in software (program) without use of a telecentric lens.

Figure 2:
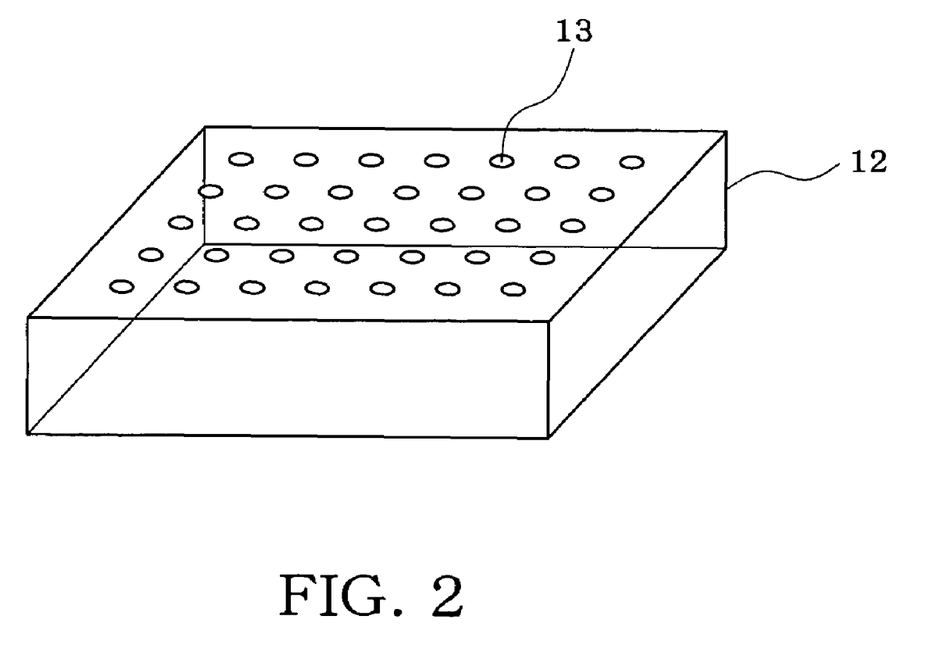
[FIG. 2] A perspective view of a calibration jig employed in an embodiment of the present invention.

A parallax correction function of the camera in the embodiment will be described below. In the embodiment, parallax data used in the parallax correction is produced as follows. Firstly, a calibration jig 12 as shown in FIG. 2 is adsorbed by an adsorption nozzle 11 and imaged by the camera so that component size per pixel is measured for every pixel of a pickup image with respect to maximum and minimum height values of an electronic component capable of being adsorbed by the adsorption nozzle 11.

The calibration jig 12 used in the measurement is made of a light-transmissible material (a transparent glass, transparent plastic or the like, for example) into the shape of a plate larger than a visual field of the camera. The calibration jig 12 has a thickness equal to the maximum height (maximum thickness) of the electronic component that can be adsorbed by the adsorption nozzle 11. The calibration jig 12 has one side on which a white circular calibration mark 13 is formed at predetermined pitches (5 mm pitch, for example) into a matrix by printing or the like. Since the calibration jig 12 is made of the light-transmissible material, the calibration mark 13 can be recognized by the camera at the backside as well as the surface side.

The reason for the calibration mark 13 being colored white is that all the members serving as background of the pickup image of the camera located over the adsorption nozzle 11 are colored black and accordingly the calibration mark 13 is colored white so that a contrast between the background (black) of the pickup image and the calibration mark (white) is increased, whereupon the calibration mark 13 is rendered easier to perceive. Accordingly, the calibration mark 13 should not be limited to the white but may be colored with another color if the calibration mark 13 is easy to perceive.

When adsorbed by the adsorption nozzle 11, the surface side (mark side) of the calibration jig 12 is then imaged by the camera at the backside of the calibration jig 12. However, since the calibration jig 12 is made of the light-transmissible material, the thickness of the jig 12 is ignored such that the same pickup image as obtained using a calibration jig with the minimum thickness (0) is obtained. The pickup image data is processed so that a position (X, Y) of a pixel corresponding to the central position of the calibration mark 13 imaged in the matrix form on the pickup image is recognized, and the number (N) of pixels with inter-mark pitches on the pickup image is counted, the component size per pixel can be obtained by calculation from the following equation:

Component size per pixel=$P/N$ where P is an inter-mark pitch (mm) on the calibration jig 12 and N is the number of pixels in the inter-mark pitch on the pickup image. Since the inter-mark pitch (P) on the calibration jig 12 is known, the component size per pixel can be computed when the number of pixels (N) in the inter-mark pitch on the pickup image is counted.

Accordingly, when the surface side (mark side) of the calibration jig 12 is adsorbed by the adsorption nozzle 11 and then imaged by the camera so that the component size per pixel is computed for every pixel of the pickup image, a component size per pixel can be obtained for every pixel of the pickup image at the minimum value (0) of the height of the electronic component capable of being adsorbed by the adsorption nozzle 11.

Subsequently, the calibration jig 12 is reversed so that the backside of the calibration jig 12 is adsorbed by the adsorption nozzle 11 and imaged by the camera. When the component size per pixel is computed for every pixel in the same manner as described above, the component size per pixel can be obtained for every pixel of the pickup image with respect to the height of the calibration jig 12 (the maximum value of the height of the electronic component capable of being adsorbed or approximate value).

Thus, the component size per pixel is previously measured for every pixel of the pickup image with respect to the maximum and minimum values of the height of the electronic component capable of being adsorbed by the adsorption nozzle 11. The resultant measurement data is stored as parallax data in a storage device (storage means) of the computer.

Figure 3:
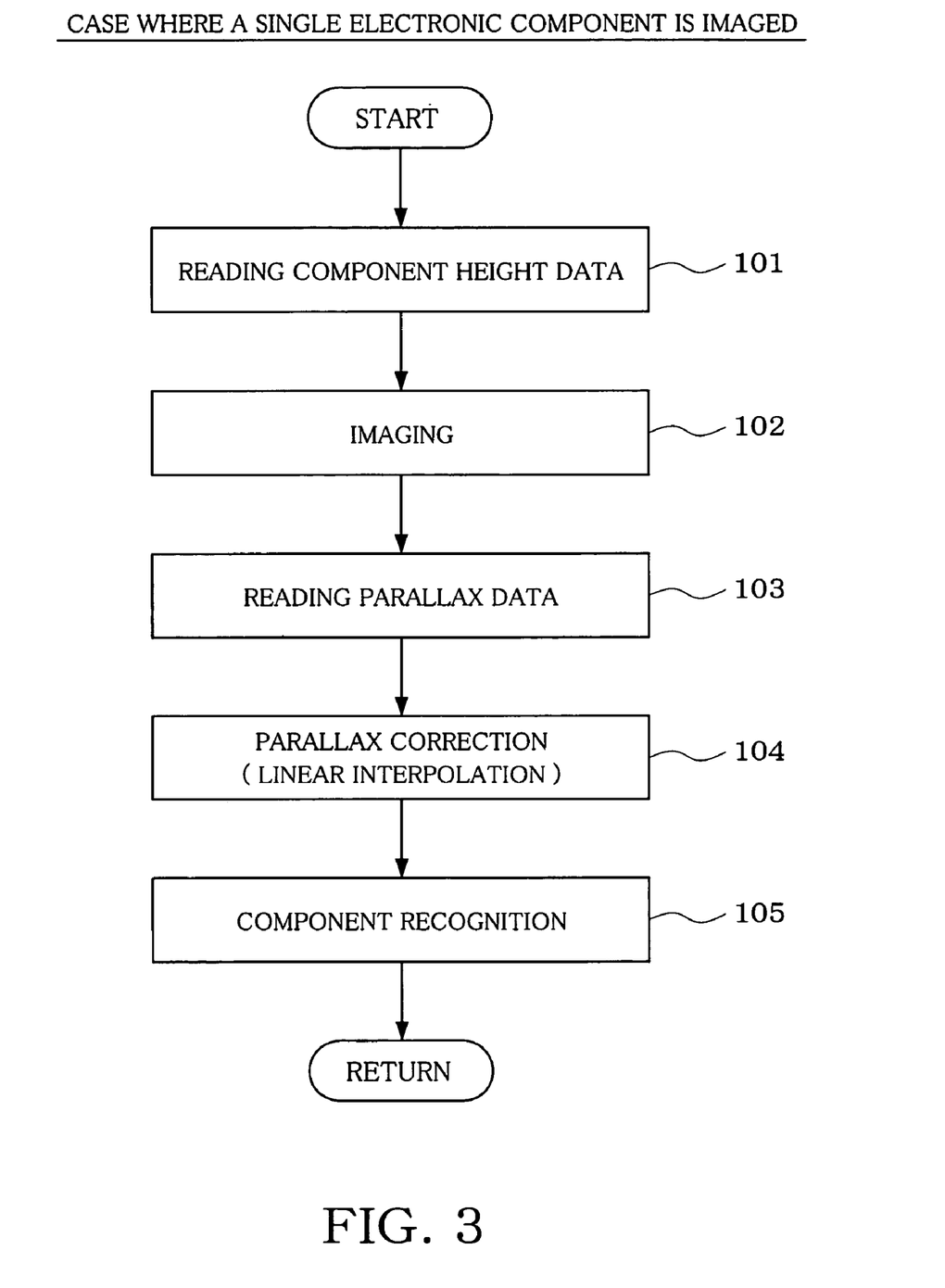
[FIG. 3] A flowchart showing the flow of processing of a pickup image processing program executed when an image of only a single electronic component is picked up by a camera.
Figure 4:
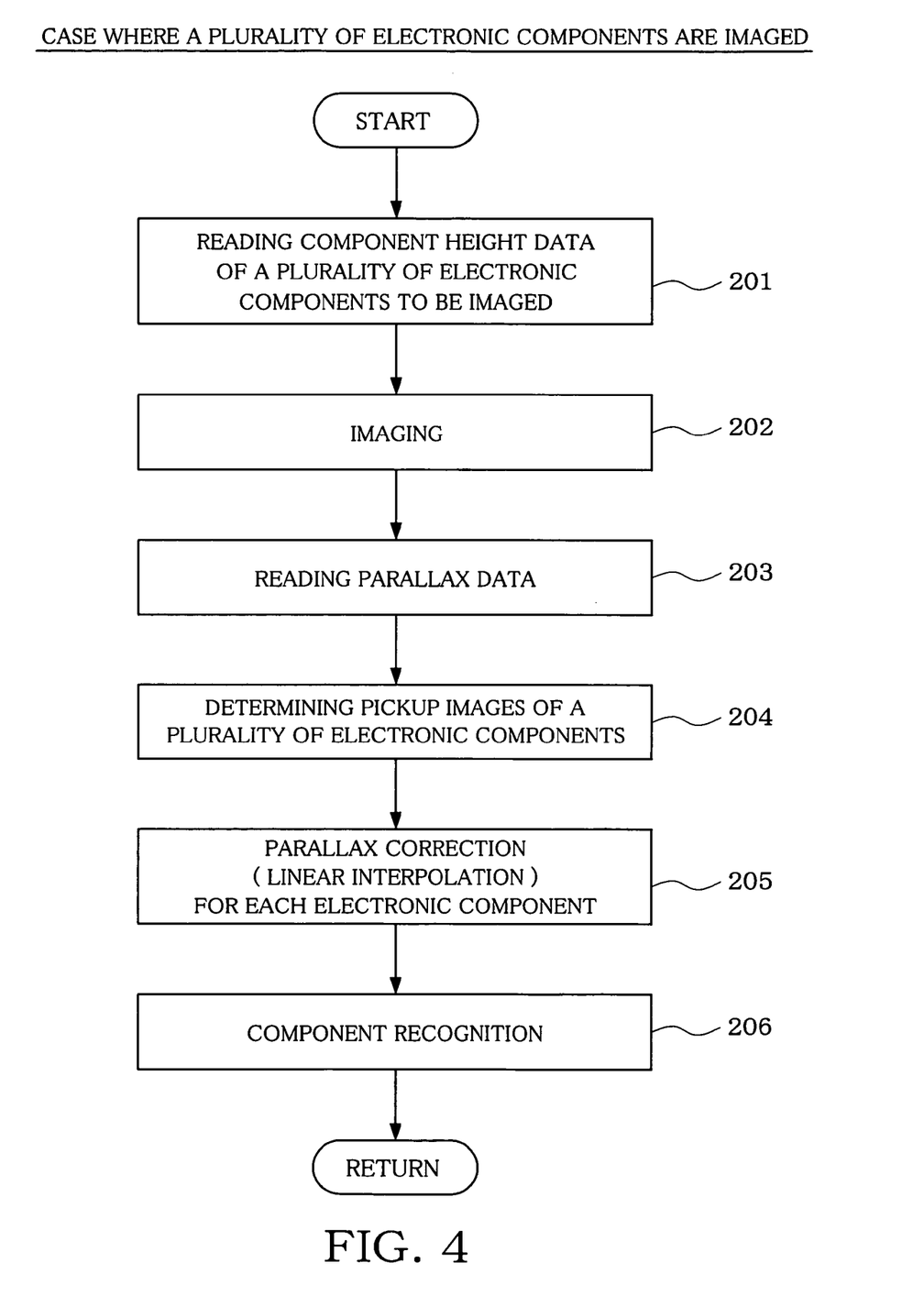
[FIG. 4] A flowchart showing the flow of processing of a pickup image processing program executed when a plurality of electronic components are caused to come within a visual field of a single camera and images of the electronic components are picked up by a camera.

The computer carries out a pickup image processing program of FIG. 3 or 4 stored in the storage device (storage means) so that the component size per pixel is corrected for every pixel of the pickup image of the electronic component using the aforesaid parallax data, whereby parallax of pickup image of the electronic component is corrected.

The parallax correction is carried out in accordance with the pickup image processing program of FIG. 3 when only one electronic component is imaged by the camera, whereas the parallax correction is carried out in accordance with the pickup image processing program of FIG. 4 when a plurality of electronic components are caused to come within the same visual field of a single camera and imaged.

When only one electronic component is imaged by the camera, the pickup image processing program of FIG. 3 is carried out. Firstly, at step 101, component height data regarding the height of the electronic component to be imaged by the camera is read from the storage device (storage means) of the computer. In this case, component height data regarding the heights of all electronic components capable of being adsorbed by the adsorption nozzle 11 is previously stored in the storage device of the computer. At step 101, component height data regarding the height of the electronic component to be imaged this time is retrieved to be read. Processing at step 101 serves as component height data capture means in the claims.

Subsequently, at step 102, the electronic component adsorbed by the adsorption nozzle 11 is imaged and thereafter, at step 103, parallax data is read from the storage device. The parallax data is produced by measuring component size per pixel for every pixel of the pickup image with respect to the maximum and minimum values of the height of the electronic component capable of being adsorbed by the adsorption nozzle 11.

Figure 5:
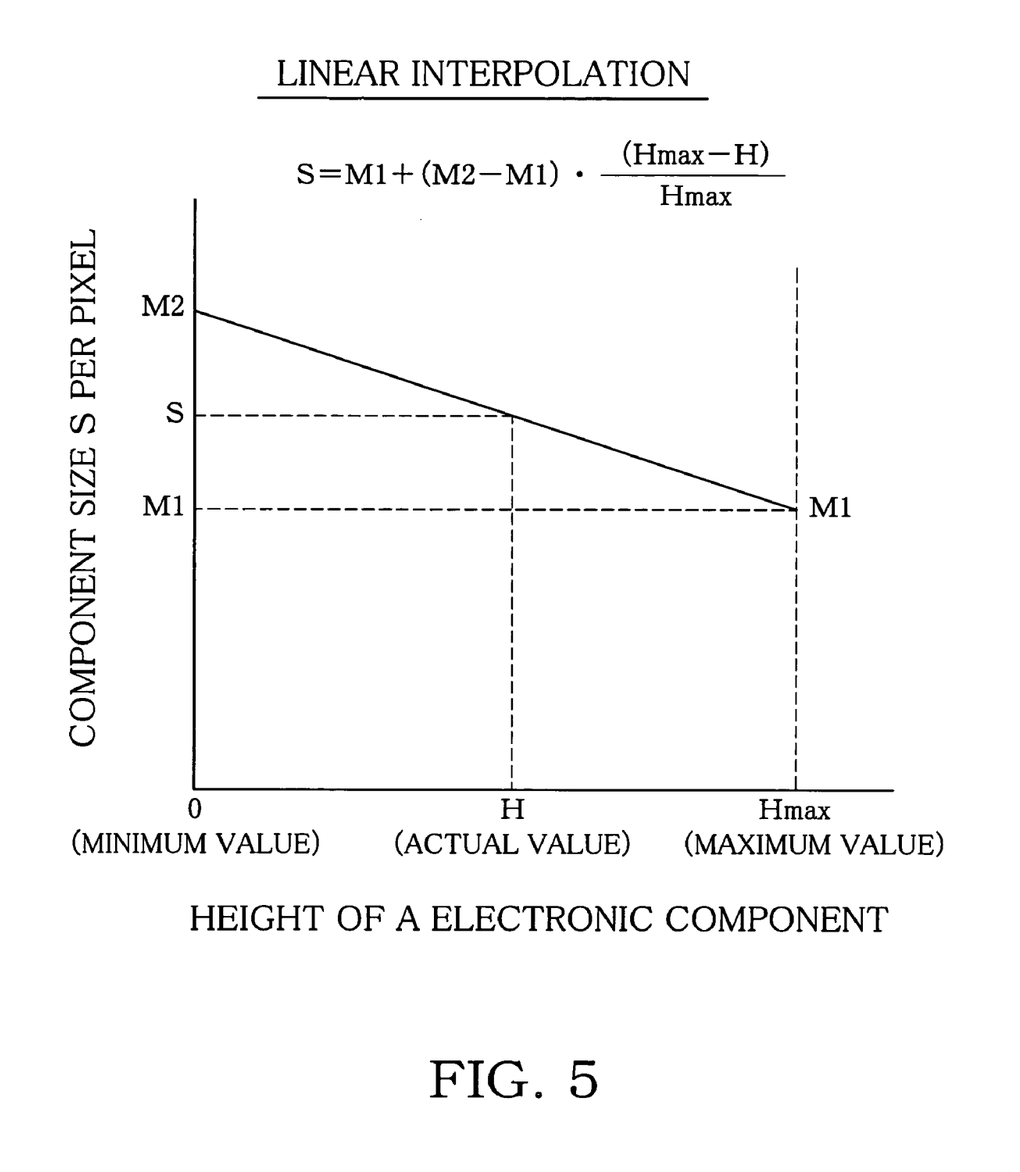
[FIG. 5] A view explaining linear interpolation.

Subsequently, at step 104, a linear interpolation is carried out for parallax data for every pixel of the pickup image of the electronic component based on the component height data read at step 101, whereby the parallax of the pickup image of the electronic component is corrected. The parallax correction is executed in the following manner. For example, as shown in FIG. 5, when M1 designates parallax data of the maximum value of component height at the position (X, Y) of any pixel, M2 designates parallax data of the minimum value of component height, and H designates the height of the electronic component to be imaged, component size S per pixel at the position (X, Y) of the pixel is shown by the following linear interpolation:

$S=M1+(M2-M1)\cdot(H_{max}-H)/H_{max}$ where $H_{max}$ indicates a maximum value of component height (the height of the calibration jig 12).

The aforesaid linear interpolation of the parallax data M1 and M2 is carried out for every pixel of the pickup image of the electronic component so that the parallax of the pickup image of the electronic component is corrected. As the result of the parallax correction, pickup image data with no parallax can be obtained as in the case where the electronic component is imaged using a telecentric lens. Processing at step 104 serves as parallax correction means in the claims.

Subsequently, at step 105, processing for recognizing the component based on the pickup image data after the parallax correction has been carried out so that appearance information (size and the like, for example) and adsorption position information (central position of the component, inclination θ and the like) of the electronic component are detected.

On the other hand, when a plurality of electronic components are caused to come within the visual field of a single camera thereby to be imaged, the pickup image processing program as shown in FIG. 4 is carried out. Firstly, at step 201, a plurality of component height data regarding the heights of a plurality of electronic components to be imaged by the camera are read from the storage device (storage means) of the computer. Processing at step 201 serves as component height data capture means in the claims.

Subsequently, at step 202, a plurality of electronic components adsorbed by a plurality of adsorption nozzles 11 respectively are caused to come within the visual field of the camera and imaged and thereafter, at step 203, parallax data is read from the storage device.

Subsequently, at step 204, pickup images of a plurality of electronic components are determined in the visual field of the camera and thereafter, at step 205, the parallaxes of pickup images of the respective electronic components are individually corrected by the linear interpolation similar to that at step 104 using the component height data and parallax data corresponding to the respective electronic components. As the result of the parallax correction for every electronic component, pickup image data of a plurality of electronic components with no parallax can be obtained as in the case where a plurality of electronic components are imaged using a telecentric lens. Processing at step 205 serves as parallax correction means in the claims.

Subsequently, at step 206, processing for recognizing each electronic component based on the pickup image data after the parallax correction has been carried out so that appearance information (size and the like, for example) and adsorption position information (central position of the component, inclination θ and the like) of each electronic component are detected.

According to the above-described embodiment, an existing electronic component mounting apparatus can be provided with a function of correcting parallax of the camera only by addition to or change in software (program) without use of a telecentric lens. Thus, the problems due to parallax correction by use of a telecentric lens can be overcome once for all.

Moreover, in the embodiment, the calibration jig 12 is used to measure component size per pixel for every pixel of the pickup image with respect to the maximum and minimum values of the height of the electronic component capable of being adsorbed by the adsorption nozzle 11. The resultant measurement data is stored in the storage device (storage means) of the computer as parallax data. The parallax data is interpolated for every pixel of the pickup image of the electronic component based on the actual component height data, whereby parallaxes can be corrected with respect to the heights of all the electronic components using the parallax data produced with respect to two larger and smaller heights of the electronic component, whereupon the parallax data can be avoided from being rendered enormous.

In the present invention, a method of producing parallax data should not be limited to producing parallax data with respect to maximum and minimum values of the height of an electronic component capable of being adsorbed by the adsorption nozzle 11. In brief, parallax data may be produced by measuring or computing component size per pixel for every pixel of pickup image with respect to larger and smaller heights of an electronic component.

Furthermore, when the present invention is applied to a system with a storage device having a sufficient storage capacity, an interval between maximum and minimum values of the height of the electronic component may be divided into sub-divisions so that parallax data is produced by measuring or computing the component size or image magnification per pixcel for every pixel of the pickup image with respect to the heights of the electronic components and stored in storage means. When electronic components are imaged by a camera, parallax data indicative of the height nearest to the data of the actual component height may be selected for parallax correction.

Furthermore, in the foregoing embodiment, when a plurality of electronic components adsorbed by a plurality of adsorption nozzles 11 respectively are caused to come within a visual field of a camera and picked up, pickup images of a plurality of electronic components are determined in the visual field of the camera, and parallaxes of pickup images of the respective electronic components are individually corrected by the linear interpolation using the component height data and parallax data corresponding to the respective electronic components. Consequently, the parallaxes of pickup images of the electronic components can individually be corrected accurately even when a plurality of electronic components have different heights or a horizontal distance from the visual field center of the camera to each electronic component differs from one to another.

Although the component size per pixel is corrected for every pixel of pickup image in the foregoing embodiment, image magnification may be corrected for every pixel of pickup image, instead.

INDUSTRIAL APPLICABILITY

The present invention can be applied in practice to various types of electronic component mounting apparatus provided with respective cameras picking up an image of electronic component adsorbed by an adsorption nozzle.

EXPLANATION OF SYMBOLS

11 . . . adsorption nozzle;
12 . . . calibration jig; and
13 . . . calibration mark

The invention claimed is:

1. A pickup image processing device for an electronic component mounting apparatus in which one or more electronic components adsorbed by one or more adsorption nozzles is imaged by a camera and appearance information and/or adsorption position information of the electronic component is detected based on a pickup image of the electronic component, the device comprising:

a storage unit which stores parallax data indicative of a relationship between a height of the electronic component and component size or image magnification per pixel for every pixel of the pickup image;

a component height data capture unit which captures means for capturing component height data with respect to the height of the electronic component actually imaged by the camera; and a parallax correction unit which corrects correcting means for correcting parallax of the pickup image by correcting the component size or image magnification per pixel for every pixel of the pickup image based on the component height data and the parallax data: wherein:

a plurality of the electronic components absorbed by a plurality of absorption nozzles respectively are imaged within the same visual field by the camera;

the component height data capture unit captures a plurality of component height data with respect to heights of the plurality of electronic components; and the parallax correction unit determines the pickup images of the plurality of electronic components in the visual field of the camera and corrects the parallaxes of the pickup images of the respective electronic components individually using the component height data and the parallax data corresponding to the respective electronic components.

2. The pickup image processing device for the electronic component mounting apparatus according to claim 1, wherein the parallax data is produced by measuring or computing the component size or image magnification per pixel for every pixel of the pickup image with respect to two larger and smaller heights of the electronic component, and the parallax correction unit interpolates the parallax data for every pixel of the pickup image of the electronic component based on the component height data, thereby correcting the parallax of the pickup image of the electronic component.

3. A method of pickup image processing for an electronic component mounting apparatus in which an electronic component adsorbed by an adsorption nozzle is imaged by a camera and appearance information and/or adsorption position information of the electronic component is detected based on pickup image of the electronic component, the method comprising:

previously producing parallax data using a calibration jig having calibration marks formed at predetermined pitches into a matrix and previously storing in a storage unit the produced parallax data indicative of a relationship between a height of the electronic component and component size or image magnification per pixel for every pixel of the pickup image;

capturing component height data with respect to the height of the electronic component actually imaged by the camera when the electronic component is imaged by the camera; and correcting parallax of the pickup image of the electronic component by correcting the component size or image magnification per pixel for every pixel of the pickup image based on the component height data and the parallax data.

4. The method of pickup image processing for the electronic component mounting apparatus according to claim 3, wherein:

the calibration jig is made of a light-transmissible material formed in a plate shape and having one side on which the calibration marks are formed;

the calibration mark side of the calibration jig is adsorbed by the adsorption nozzle and imaged by the camera so that each position of each of the calibration marks is recognized, thereby computing a component size or image magnification per pixel for every pixel of the pickup image with respect to a minimum height of the electronic component, and the computed value is stored as parallax data at the minimum height of the electronic component in the storage unit; and the other side of the calibration jig opposed to the calibration marks is adsorbed by the adsorption nozzle and imaged by the camera so that each position of each of the calibration marks is recognized, thereby computing a component size or image magnification per pixel for every pixel of the pickup image with respect to the same height of the electronic component as a height of the calibration jig, and the computed value is stored in the storage unit as parallax data with respect to the same height of the electronic component as the height of the calibration jig.

* * * * *